June 19, 1962 P. CARDI 3,039,793
SAFETY HOSE
Filed Aug. 11, 1959

INVENTOR.
PAUL CARDI
BY
ATTORNEY 3,039,793
SAFETY HOSE
Paul Cardi, 1375 Park Ave., Cranston, R.I.
Filed Aug. 11, 1959, Ser. No. 833,018
4 Claims. (Cl. 284—2)

My present invention relates to a novel construction of a safety hose for use in transferring fluid under pressure.

The principal object of the present invention is to provide a safety hose with valve arrangements at each end which will automatically cut off the flow of fluid if the hose is accidently broken or disconnected.

Another object of the present invention is to provide a safety hose construction designed to cooperate with a fluid valve to provide a safety cut off in case of failure of the hose.

A further object of the present invention is to provide a safety hose which is easy and economical to manufacture and assemble.

With the above and other objects and advantageous features in view, my invention consists of a novel arrangement of parts more fully disclosed in the detailed description following, in conjunction with the accompanying drawings, and more particularly defined in the appended claims.

Figure 1:
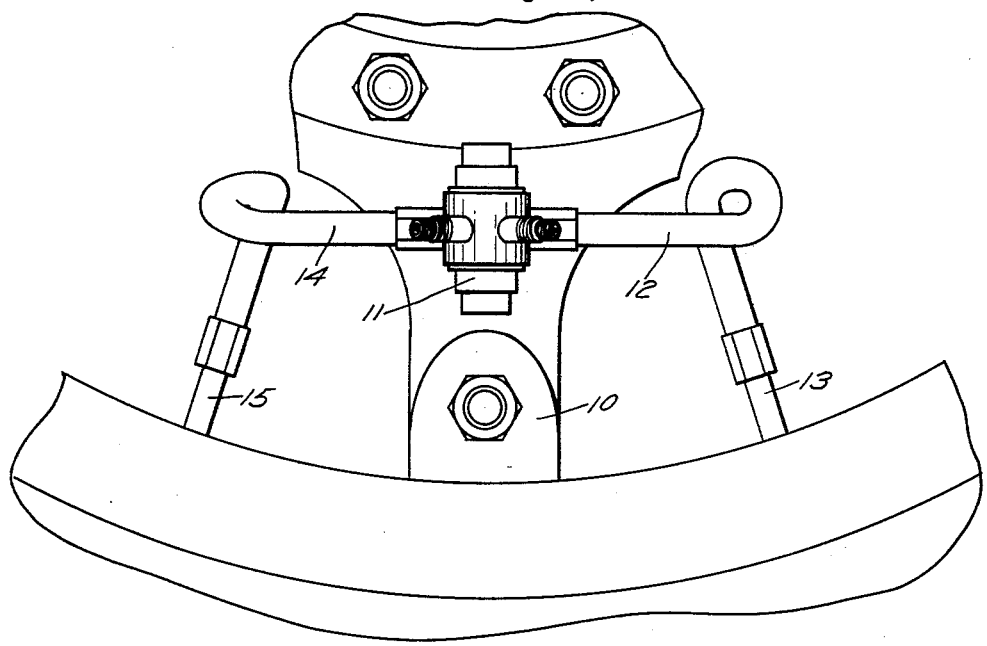
FIG. 1 is a fragmentary view of an automotive air valve assembly showing the use of the safety hose of the present invention.

In many installations it is desirable to maintain a steady flow of fluid pressure through a connecting hose. If the hose should be suddenly torn or disconnected there is a loss of fluid pressure and of the fluid itself. For example, when oil or fuel is being transferred from ship to shore or from ship to ship, a sudden swing of the ship often causes a parting of the hose and a large loss of fuel before the valves can be shut off. The present invention is designed to provide a safety hose and valve arrangement so that a parting or breaking of the hose will cause an immediate closure of the valves at each end thus holding the loss of fuel to an absolute minimum.

The hose of the present invention has also been used with pressure equalizing valves on dual tires. If an ordinary hose should break in this position the air in the tire would be lost. However, the safety hose of the present invention is designed to provide a valve shut off which prevents the escape of the tire pressure when the hose is disrupted. The illustrated form shows the application of the hose to an automotive tire. However, the invention can readily be applied to any other type of fluid transfer.

Referring more in detail to the drawings, the vehicle wheel 10 is illustrated with a pressure equalizing valve 11 connected by a hose 12 to the valve stem 13 of one tire and by a hose 14 to the valve stem 15 of the other tire. The hose connections 12 and 14 constitute the safety hose construction of the present invention.

Each hose comprises a body portion 16 made of rubber or any other suitable flexible material. The body portion 16 is provided with the central opening 17 through which the fluid flows. A coil spring 18 extends through the opening 17 of the hose and has a diameter slightly less than the diameter of the hose opening 17 to permit easy sliding movement of the coil spring. In normal relaxed position the coil spring 18 is longer than the hose 16 so that a considerable amount of pressure is necessary to compress the spring 18 and force it within the confines of the hose 16.

Figure 2:
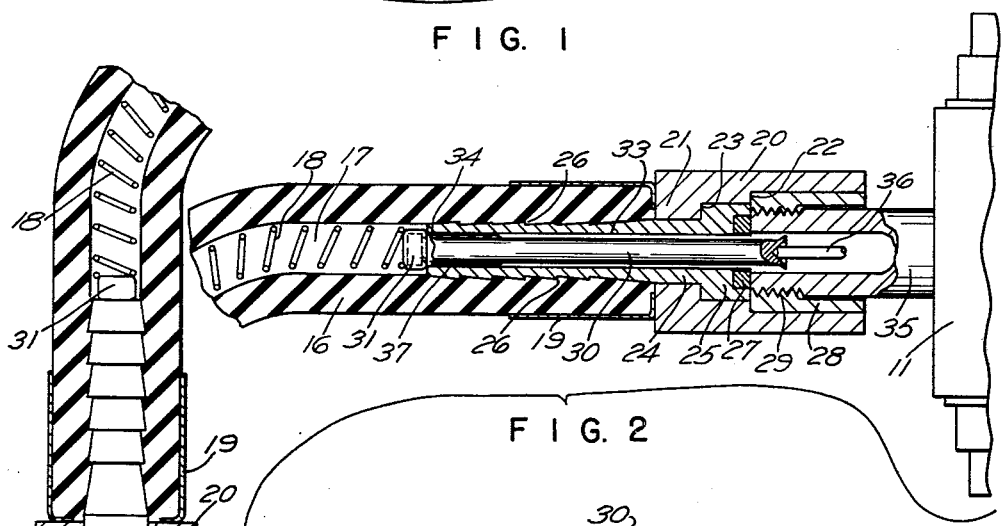
FIG. 2 is an enlarged longitudinal section of the hose and valve assembly at one end of the hose and the hose and valve assembly at the other end of the hose.

At each end the hose 16 is provided with an assembly designed to retain the spring 18 under compression within the hose and to retain a fluid valve under pressure in open position. Referring to FIG. 2, each end of the hose 16 may be provided with a metal reinforcing ferrule or cap 19. I provide a housing 20 having an end wall 21 abutting the end of the hose 16. The housing 20 is open at the end opposite the wall 21 and the intermediate side walls are provided with shoulders 22 and 23. An elongated T-shaped member 24 is mounted in the housing 20 so that its head 25 is against the end wall 21 abutting the shoulder 23. The elongated stem of the member 24 is tapered and provided with sharp cut back ribs 26 so that it can be forced into the end of the hose opening 17 and be frictionally retained therein as shown in FIG. 2. The other side of the head 25 is provided with a washer or packing 27 countersunk in the surface. A sleeve 28 is forced tightly into the housing 20 against the shoulder 22 to retain the T-shaped member 24 in position. The thickness of the head 25 is such that a clearance is provided between the head 25 and sleeve 28 to permit free rotation of the housing around the head 25. The sleeve 28 is provided adjacent the inner end with internal threads 29.

Figure 3:
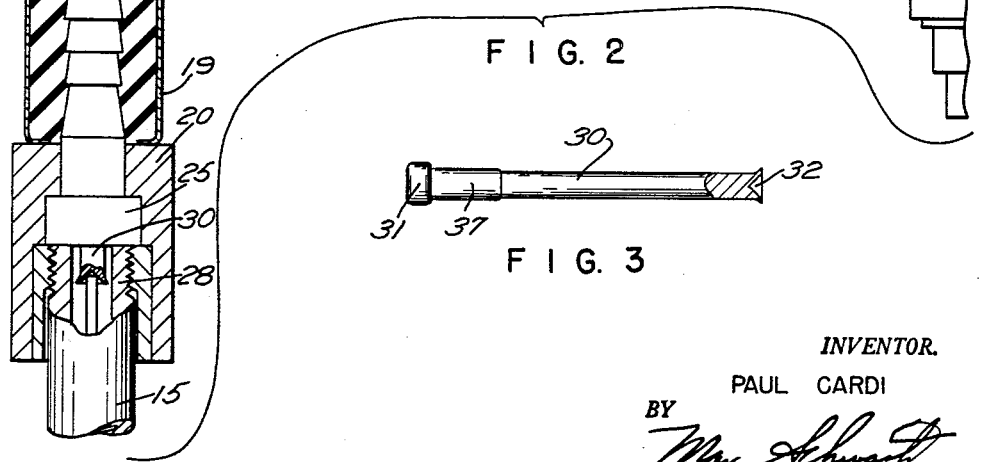
FIG. 3 is a side elevation of one of the valve pins.

I now provide an elongated pin 30 shown in FIG. 3 having a head 31 at one end and a conical recess 32 in the opposite end. The T-shaped member 24 is provided with a central opening 33 having a diameter considerably greater than the pin 30 but smaller than the head 31. The pin 30 is inserted into the opening 33 prior to assembly so that the spring 18 rests against the top of the head 31 and retains the pin tightly against the end of the member 24. It will be noted that in this position the pin 30 is of sufficient length to extend through the head 25 into the sleeve 28. The end of the member 24 may be cut or scalloped as at 34 to allow the free passage of the fluid or air through the member 24 with the parts positioned as shown in FIG. 2.

The pressure equalizing valve 11 is provided with a conventional type air valve 35 having a central spring operated pin 36. This is the conventional type of automotive tire valves in which inward pressure on the pin 36 opens the valve. In connecting the hose, the housing 20 is slipped over the valve 35 and turned so that the threads 29 inside the collar 28 engage the outside threads on the valve. As can be seen in FIG. 2, the end 32 of the pin 30 engages the valve stem 36 and forces it inwardly against the pressure of the valve spring. The spring 18 being stiffer than the valve spring, the pin 30 will force the valve stem 36 inwardly to open the valve. Air or fluid can then pass through the opening 33 and into the hose opening 17. It should be noted that when the housing is screwed tightly on to the valve stem, the packing or washer 27 will engage the end of the valve stem to force a tight seal. The inward movement of the threads 29 is slightly greater than the limit of inward movement of the valve stem 36. With the result that after the valve stem 36 has reached the limit of its inward movement, further movement of the housing 20 along the threads will force the pin 30 inwardly against the action of the spring 18 further opening the passageway 33.

The air or other fluid is now free to flow into the hose opening 17. However, to prevent waste or leakage before the other end of the hose is connected, the pin 30 at the other end may be dipped in a rubber or other sealing solution at 37. The pressure of the spring 18 will force the head 31 against the end of the T-shaped member 24 to seal the passageway. Now when the other end is also screwed on to a valve the same action will take place. The pin 30 will force the valve stem inwardly to its limit and then further movement will cause the pin 30 to be pushed inwardly against the action of the spring 18 opening the passageway and allowing free flow through both valves and through the hose 16.

The safety hose is now properly in place and connected. Now assume that one of the valve connections is accidently torn or ripped off so that the hose 16 is pulled from the member 24. The spring 18 will immediately be released from all tension and the spring pressure will be removed from the head 31 of each pin 30. The valve stem at each end will therefore spring outwardly, pushing the pin 30 ahead of it and closing both valves. Very little air is therefore lost. If the hose 16 be cut or broken in the middle it will be found that the spring will immediately bulge through the cut or break because of its tension, taking the pressure off the pins at each end and allowing the valves to close.

The safety hose of the present invention is therefore used in combination with a valve at each end having a spring pressed closure member which is kept in open position by the spring pressure in the hose. When this pressure is released by a break the valves close shutting off further flow of fluid. In larger installations, such as the transfer of oil, the pins 30 may operate on spring pressed switches designed to close larger valves either hydraulically or electrically. Other advantages and variations of the present invention will be readily apparent to a person skilled in the art.

I claim:

1. The combination of a pair of valved coupling members and a safety hose construction comprising a flexible tubular hose, a coil spring positioned in said hose, means mounted at each end of said hose for attaching said hose to a valved coupling member, each of said valved coupling members having a spring-pressed valved pin, and an actuating member extending through each of said attaching means for retaining said valved pins in open position, said actuating members being axially slidable in said attaching means, said spring extending the length of said hose and bearing against said actuating members at each end, said spring having a greater tension than said spring-pressed valved pins whereby said actuating members will yieldingly retain said valved pins in open position at each end of said hose.

2. The combination of a pair of valved coupling members and a safety hose construction comprising a flexible tubular hose, a coil spring positioned in said hose, means mounted at each end of said hose for attaching said hose to a valved coupling member, each of said valved coupling members having a spring-pressed valved pin, and an actuating member extending through each of said attaching means for retaining said valved pins in open position, said actuating members being axially slidable in said attaching means, said spring extending the length of said hose and bearing against said actuating members at each end, said spring having a greater tension then said spring-pressed valved pins whereby said actuating members will yieldingly retain said valved pins in open position at each end of said hose, each of said attaching means comprising a tubular portion extending into the end of said hose, the outer end of said tubular portion being T-shaped, and an internally threaded housing rotatably mounted on said T-shaped end.

3. The combination of a pair of valved coupling members and a safety hose construction comprising a flexible tubular hose, a coil spring positioned in said hose, means mounted at each end of said hose for attaching said hose to a valved coupling member, each of said valved coupling members having a spring-pressed valved pin, and an actuating member extending through each of said attaching means for retaining said valved pins in open position, said actuating members being axially slidable in said attaching means, said spring extending the length of said hose and bearing against said actuating members at each end, said spring having a greater tension than said spring-pressed valved pins whereby said actuating members will yieldingly retain said valved pins in open position at each end of said hose, each of said attaching means comprising a tubular portion extending into the end of said hose, the outer end of said tubular portion being T-shaped, and an internally threaded housing rotatably mounted on said T-shaped end, each of said actuating members including an elongated pin extending from said hose through said attaching means.

4. The combination of a pair of valved coupling members and a safety hose construction comprising a flexible tubular hose, a coil spring positioned in said hose, means mounted at each end of said hose for attaching said hose to a valved coupling member, each of said valved coupling members having a spring-pressed valved pin, and an actuating member extending through each of said attaching means for retaining said valved pins in open position, said actuating members being axially slidable in said attaching means, said spring extending the length of said hose and bearing against said actuating members at each end, said spring having a greater tension than said spring-pressed valved pins whereby said actuating members will yieldingly retain said valved pins in open position at each end of said hose, each of said attaching means comprising a tubular portion extending into the end of said hose, the outer end of said tubular portion being T-shaped, and an internally threaded housing rotatably mounted on said T-shaped end, each of said actuating members including an elongated pin extending from said hose through said attaching means, said elongated pins being forced against said spring-pressed valved pins by said coil spring.

References Cited in the file of this patent

UNITED STATES PATENTS

| | | |
|---|---|---|
| 634,537 | McDermott et al. | Oct. 10, 1899 |
| 1,364,147 | Spahr | Jan. 4, 1921 |
| 2,158,576 | Glassley | May 16, 1939 |
| 2,409,753 | Harrison et al. | Oct. 22, 1946 |
| 2,679,654 | Hosking | June 1, 1954 |
| 2,761,469 | Hansen | Sept. 4, 1956 |
| 2,819,914 | Eitner | Jan. 14, 1958 |

FOREIGN PATENTS

| | | |
|---|---|---|
| 1,159,039 | France | Feb. 3, 1958 |
| 515,256 | France | Nov. 24, 1920 |
| 426,524 | Great Britain | Apr. 4, 1935 |